United States Patent [19]

Haka

[11] Patent Number: 6,162,144

[45] Date of Patent: Dec. 19, 2000

[54] TRACTION COEFFICIENT CONTROL FOR A CONTINUOUSLY VARIABLE TRANSMISSION

[75] Inventor: Raymond James Haka, Brighton, Mich.

[73] Assignee: General Motors Corporation, Detroit, Mich.

[21] Appl. No.: 09/323,259

[22] Filed: Jun. 1, 1999

[51] Int. Cl.[7] .................................................. F16H 61/30
[52] U.S. Cl. ............................................ 476/10; 475/216
[58] Field of Search .................................. 476/10, 9, 40, 476/41, 42, 2; 475/216, 217

[56] References Cited

U.S. PATENT DOCUMENTS

| | | | |
|---|---|---|---|
| 4,911,030 | 3/1990 | Kraus | 476/10 |
| 5,607,372 | 3/1997 | Lohr | 475/216 |

*Primary Examiner*—David Fenstermacher
*Attorney, Agent, or Firm*—Laura C. Hargitt

[57] ABSTRACT

A continuously variable toric transmission has rollers which engage semi-toroidal disc members to establish a drive relation therebetween. The annular disposition of the rollers relative to the toroidal members determines the speed relationship between the toroidal members. The rollers are urged into a space between the discs by one force and the discs are urged together by another force. Thus, the discs have a normal force and a traction force, the ratio of which is equal to the coefficient of traction. Controlling the ratio of the traction force to the normal force controls the coefficient of traction within a predetermined range of values. The traction force is affected by a controlled pressure differential across a piston which forces the rollers into the space between the discs, and a pressure urging the discs toward each other affects the normal force. By controlling these pressures, the coefficient of traction is controllable.

7 Claims, 3 Drawing Sheets

TRACTION COEFFICIENT CONTROL FOR A CONTINUOUSLY VARIABLE TRANSMISSION

TECHNICAL FIELD

This invention relates to the control of toroidal traction drives and more particularly to the control of the coefficient of traction in toroidal drives.

BACKGROUND OF THE INVENTION

Toric or toroidal-type traction drive transmissions transmit torque from one rotating semi-toroidal member or disc to another semi-toroidal member or disc by roller members through a traction force. The roller members are supported on a traction fluid oil film through which the traction force is transmitted. A force which creates a normal force between the rollers and the discs urges the discs toward each other. The traction force divided by the normal force defines a coefficient of traction. The rollers and discs have a maximum allowable normal force, determined by Hertzian contact stresses, which limits the input torque to the toric drive. The input torque to the transmission will be maintained below a value determined by the Hertzian contact stresses such that the normal force is within a safe range.

The maximum input torque equals the product of the radius of the contact point on the input disc, the normal force and the maximum coefficient of traction of the traction fluid. If the input torque exceeds this value, detrimental slippage will occur between the discs and the rollers which can significantly damage the transmission. To prevent this from occurring, the normal force and traction force must be controlled to maintain the coefficient of traction below the maximum allowable value.

Traction drives have employed various strategies to control the normal force between the rollers and the discs. One such strategy is to apply hydraulic pressure to force the discs axially toward the roller. This permits much flexibility in controlling the ratio of normal force to traction force. However, this requires a control system that can determine the input torque, the speed ratio of the traction drive and the maximum possible coefficient of traction for all operating conditions.

Another strategy employs a cam loading system which operates on the input disc to apply an axial force which is a linear function of the input torque. This strategy does not need to have a separate input torque measurement; however, this does not compensate for changes in speed ratio. This results in the system being operated at a sub-optimal coefficient of traction at all but one operating condition.

U.S. Pat. No. 5,607,372 describes a toric drive system which improves the hydraulic control of the normal force. This system directs hydraulic pressure to react against a traction force piston and employs the same pressure level to apply an axial force piston to the discs. While this ensures that the ratio of traction force to normal force is constant, it does not compensate for the steer angle of the rollers which varies as a function of the cosine of the roller steer angle.

SUMMARY OF THE INVENTION

It is an object of the present invention to provide an improved control for a coefficient of traction in a traction drive.

In one aspect of the present invention, a traction drive force apply piston has a pressure differential imposed thereon to control the traction force in a traction drive. In another aspect of the present invention, a normal force is applied to the discs of a traction drive, and a secondary variable force partially counteracts the normal force to provide a variable traction coefficient.

In yet another aspect of the present invention, a traction force apply piston has a fixed differential pressure imposed thereon and a normal force apply piston has a controlled variable differential pressure imposed thereon. In still another aspect of the present invention, the normal force apply piston has a constant differential pressure applied thereto and the traction force apply piston has a controlled differential pressure applied thereto.

DESCRIPTION OF THE EXEMPLARY EMBODIMENTS

Figure 1:
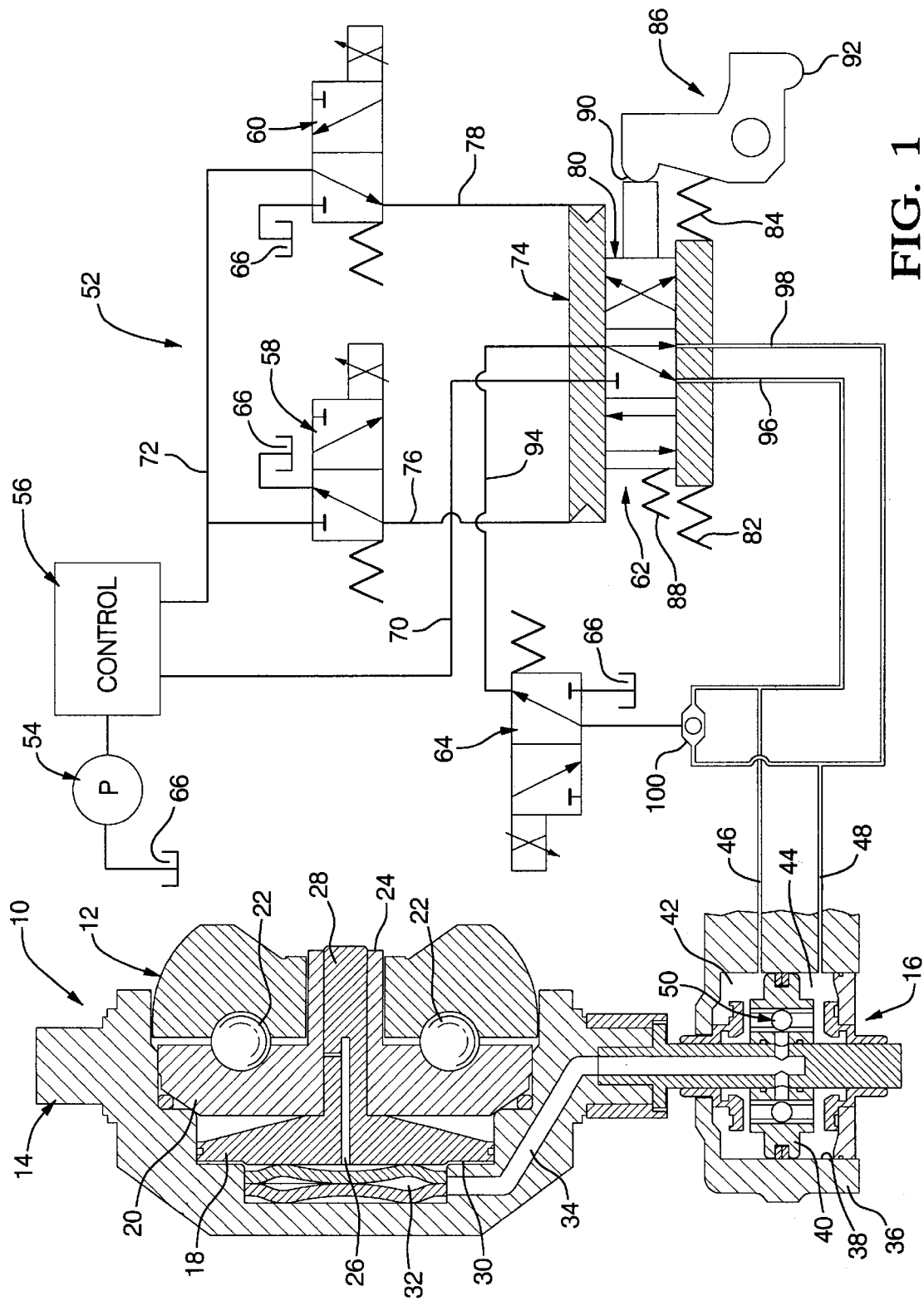
FIG. 1 is a side elevational view of a traction drive roller and a schematic representation of pressure controls for a traction drive employing one embodiment of the invention.

FIG. 1 depicts a single traction roller assembly 10 for use in a conventional traction drive transmission, not shown. The transmission will comprise two or more of the traction roller assemblies disposed between the input and output discs of the transmission. These structures are well known, and one such example thereof is shown in U.S. Pat. No. 5,607,372 issued to Lohr on Mar. 4, 1997. Since the present invention is directed to the control of the traction roller assembly 10, it is not believed necessary to show and describe a complete transmission for a proper understanding of the invention presented herein. The operation of toric transmissions is well known; however, a brief review might be helpful.

The transmission includes a pair of spaced semi-toroidal discs, not shown in FIG. 1, which are engaged by a roller 12, which is a component of the traction roller assemblies 10. At least one disc is an input member, driven by a power source, and the other disc is an output member. The roller 12 frictionally engages the discs to transfer power from the input member to the output member. In order to maintain the friction drive between the discs, a normal force acting against the disc is needed and a traction force acting between the roller 12 and the discs is needed. It is the ratio of these forces to which the present invention is directed. The ratio of the traction force (TF) to the normal force (NF) is defined as the coefficient of traction (u). In equation form, this appears as: u=TF/NF.

The traction roller assembly 10 also includes a trunnion 14 and a hydraulic piston assembly 16. The trunnion 14 has a piston 18 and a backing plate 20 that support the traction roller 12 rotatably and axially. Bearings 22, positioned between the plate 20 and the traction roller 12, permit relative rotation between the backing plate 20 and the traction roller 12. A sleeve extension 24 of the backing plate 20 supports the traction roller 12, on a bearing not shown, for rotation. The piston 18 has a central passage 26 in a cylindrical portion 28 which supplies lubrication to the rotary support provided by the backing plate 20.

The piston 18 is slidably disposed in a cavity or cylinder 30 formed in the trunnion 14 and urged into abutment with the backing plate 20 by a pair of springs 32. The springs 32 impose a preload on the traction roller 30 through the piston 18 and backing 20. The cylinder 30 is in fluid communication with the hydraulic piston assembly 16 through a passage 34. Fluid pressure in the passage 34 and therefore cylinder 30 will urge the piston 18 toward the traction roller 12. This will increase the normal force between the traction roller 12 and the discs.

The hydraulic piston 16 includes a housing 36 enclosing a cylinder 38 in which is slidably disposed a piston and rod 40. The piston and rod 40 divides the cylinder into equal area chambers including a first chamber 42 and a second chamber 44. The chamber 42 is in fluid communication with a passage 46 and the chamber 44 is in fluid communication with a passage 48. The piston and rod 40 houses a plurality of ball check valves 50 which permit fluid communication between the chambers 42 and 44 and the passage 34 depending on which of the chambers 42 or 44 has the highest pressure level. Pressure on the piston and rod 40 will translate as a force on the trunnion 14 and the traction roller 12.

This force on the traction roller 12 is the traction force between the traction rollers 12 and the discs. A traction force is imposed on each disc by the force generated at the piston and rod 40. By controlling the pressure in both chambers 42 and 44, the net effective force of the piston and rod 40 is controlled which thereby controls the traction force of the traction roller 12. It should be noted that the maximum pressure in the chambers 42 and 44 is also the pressure in the cylinder 30 such that a relationship is established between the traction force and the normal force.

The pressure in the chambers 42 and 44 is established by a hydraulic control system 52 which includes a pump 54, an electro-hydraulic control 56, a pair of ratio valves 58 and 60, a ratio control valve 62 and pwm solenoid valve 64. The pump 54 is a conventional pump which draws hydraulic fluid from a reservoir 66 and delivers the fluid to the electro 20 hydraulic control 56 from which the fluid is delivered to the valves 58, 60 and 62. The control 56 is a conventional pressure and flow control device and preferably includes an electronic control module (ECU), not shown, in which is incorporated a conventional programmable digital computer. The ECU delivers control signals to pulse width modulated (pwm) solenoids at the valves 58, 60 and 64 in a well-known manner.

The control 56 delivers system pressure to a passage 70 which is connected with the ratio control valve 62 and a ratio control pressure in a passage 72 to the ratio valves 58 and 60. The ratio valves 58 and 60 are pressure control type valves, the pressure output of which is controlled by respective pwm solenoids. The valve 58 delivers a control pressure through a passage 76 to the right end of a sleeve 74, which is a component of the ratio control valve 62. The ratio valve 60 delivers a control pressure to the left end of the sleeve 74 through a passage 78.

The ratio control valve 62 has a spool 80 slidably disposed in the sleeve 74. A pair of springs 82 and 84 urge the sleeve 74 toward a center position, and the spool 80 is urged to the right to seat against a feedback lever 86 by a spring 88. The feedback lever 86 is a bellcrank having one end 90 abutting the spool 80 and another end 92 is controlled by the angular position of the traction roller assembly 10 through contact with a cam, not shown, formed on the piston and rod 40. Thus, the spool 80 responds to the ratio in the traction drive to control the traction force at the traction roller 12, and the sleeve 74 is positioned by the valves 58 and 60 and the springs 82 and 84. The sleeve 74 is in fluid communication with the passage 70, a passage 94, a passage 96 and a passage 98.

The passage 94 communicates with the pwm valve 64 and the passages 96 and 98 communicate with the passages 46 and 48, respectively, and also with opposite ends of a conventional ball shuttle valve 100. The ball shuttle 100 has an outlet passage 102 that delivers fluid to the pwm valve 64. As is well known, the ball shuttle 100 will deliver the highest of the pressures in the passages 96 and 98 to the passage 100. The pressure in the passage 96 acts in the chamber 42 to urge the piston and rod 40 downward, and the pressure in the passage 98 acts in the chamber 44 to urge the piston and rod 40 upward. The piston and rod 40 moves in response to the differential pressure between the chambers 42 and 44 to change the ratio of the toric drive. When the desired ratio has been achieved, the differential pressure between the chambers 42 and 44 will be set by the valve 62 to maintain the traction roller 12 in the location between the discs as dictated by the desired ratio.

The pressure in the passage 94 is determined by the pwm valve 64 which responds to a control pressure determined by the duty cycle of the pwm solenoid controlling the valve 64. The pressure output of the pwm valve 64 is controlled by the ECU which establishes the duty cycle of the pwm based on data stored in look-up tables in a conventional manner. The valve 64 establishes the lower of the two pressures acting on the piston and rod 40. The valve 62 is effective to deliver the high and low pressures to the proper chambers 42 and 44 as determined by the ratio valves 58 and 60.

If the ratio valve 58 is commanded to deliver a control pressure to the sleeve 74 and thereby move the sleeve 74 rightward, the system pressure in the passage 70 will be delivered to the passage 98 and chamber 44 as well as to the ball shuttle valve 100. The pwm solenoid 64 receives fluid from the shuttle valve 100 and outputs fluid pressure to the passage 94 based on the duty cycle established by the ECU. The fluid in the passage 94 is directed through the valve 62 to the passage 98, which is connected with the chamber 44. Thus, high pressure is established in the chamber 42 and a variable low pressure is established in the chamber 44 to create a differential pressure on the piston and rod 40 which will result in a traction force at the roller 12 and the discs in friction engagement therewith. The spool 80 responds to the feedback lever 86 as positioned by the piston and rod 40 to maintain the proper pressure differential on the piston and rod 40.

If the ratio valve 60 is commanded to supply control pressure through passage 78 to the sleeve 74, the chambers 42 and 44 of the piston and rod 40 will be pressurized in the opposite manner. The spool 80 will be properly positioned by the feedback lever 86. That is, the chamber 44 will have the higher pressure and the chamber 42 will receive the pressure generated by the pwm solenoid 64. It should also be appreciated that the cavity 30 will always receive the highest of the pressures in the chambers 42 and 44 because of the ball check valves 50. Thus, the normal force (NF) on the rollers 12 will be determined by the higher pressure in the system multiplied by the area of the piston 18, and the traction force (TF) will be determined by the differential pressure in the chambers 42 and 44 multiplied by twice the area of the piston and rod 40. The normal force divided by the traction force equals the coefficient of traction. This relation may be represented in equation form as follows:

$u = TF/NF$ $NF = Hp*A1/(2*\sin alpha)$ $TF = (Hp-Lp)*0.5*A2$ $u = (Hp-Lp)*0.5*A2/Hp*A1/(2*\sin alpha)$ or $$u=(1-Lp/Hp)*(2*\sin alpha*A1/A2)=(1-Lp/Hp)*constant$$

where:
- u=the coefficient of traction
- Hp=the high pressure in the system
- Lp=the low pressure in the system
- A1=the area of piston 18
- A2=the area of piston and rod 40
- alhpa=roller angle of contact.

Thus, the coefficient of traction is dependent on the ratio of the pressures on the piston and rod 40. It should be noted that by raising the low pressure above sump pressure, the coefficient of traction will be reduced. It is necessary, therefore, to select the piston areas that provide the highest expected coefficient of traction with the low pressure equal to zero such that an increase in the low pressure will permit a reduction in the coefficient of traction when necessary such as when the temperature of the traction fluid increases. The low pressure is controlled to vary with performance characteristics of the traction fluid dispensed between the rollers 12 and the discs. For example, the ability of the traction fluid to support the friction between the rollers 12 and the discs will vary with fluid temperature. When the low pressure is varied in accordance with the temperature of the traction fluid, the transfer of power through the friction interface will be maintained at an efficient level. The present invention provides this function through the selective control of the pressures in the cylinder 30 and the chambers 42 and 44.

Figure 2:
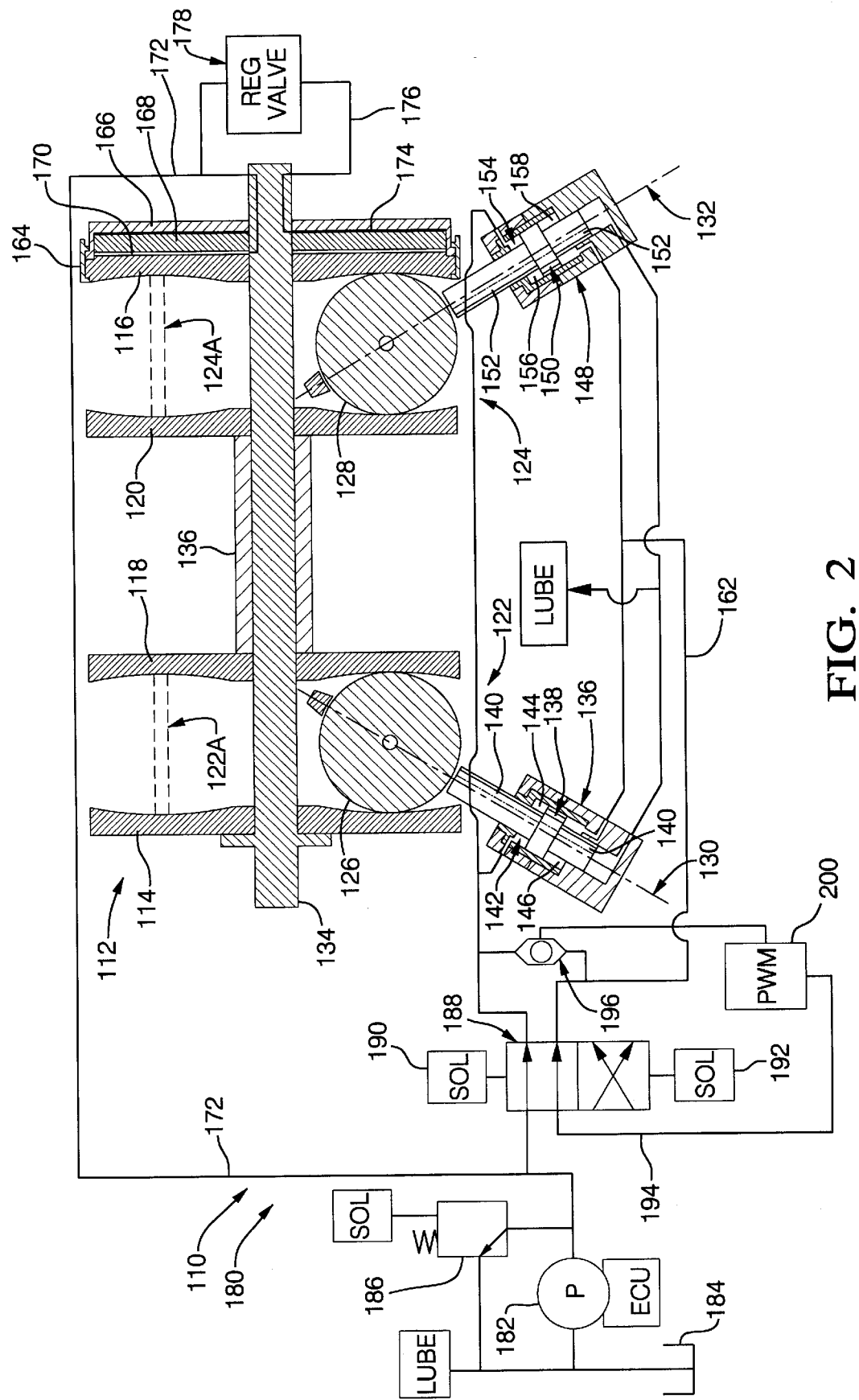
FIG. 2 is a diagrammatic representation of traction drive incorporating another embodiment of the present invention.

A traction drive and control 110, shown diagrammatically in FIG. 2, has a traction transmission 112 incorporating two input discs 114, 116, two output discs 118, 120 and traction roller assemblies 122 and 124. The traction roller assembly 122 is one of several such assemblies spaced equiangularly within the toroidal cavity formed by the discs 114 and 118, and the traction roller assembly is one of several such traction assemblies spaced equiangularly within the toroidal cavity formed between the discs 116 and 120. The traction roller assemblies 122, 124 are shown rotated 90 degrees from the operable positions when the traction drive is in a one-to-one ratio. The dashed representations at 122A and 124A show the rollers 126 and 128 in the operable one-to-one ratio. The traction roller assemblies 122, 124 and therefore the rollers 126, 128 are rotated about their respective axes 130, 132 to adjust the ratio between the input discs 114, 116 and the output discs 118, 120. The operation of these devices is well known.

The input discs 114, 116 are interconnected for common rotation by an input shaft 134, which is drivingly connected with a power source, not shown, such as an internal combustion engine. The output discs 118, 120 are interconnected for common rotation by a sleeve shaft 136. The sleeve shaft 136 is drivingly connected with an output drive mechanism, not shown, to deliver power from the traction drive. The output drive mechanism can be any of the well-known types such as counter shaft gearing or chain and sprocket drives. The present invention is not to be limited to any specific gearing apparatus that can be associated with the traction drives.

The traction roller assembly 122 has a traction force control piston assembly 136 which includes a piston 138 and rod 140 slidably disposed in a cavity 142 and cooperating therewith to form two pressure chambers or cylinders 144, 146. The piston assembly 136 can be similar in construction to piston assembly 16 shown in FIG. 1. The chambers 144, 146 have equal areas such that pressure introduced thereto will establish a force on the rod 140 in accordance with the differential of the pressure in the chambers 144, 146.

The traction roller assembly 124 is substantially identical with the traction roller assembly 122 and includes a traction force control piston assembly 148, which includes a piston 150, and rod 152 slidably disposed in a cavity 154 and cooperating therewith to form two pressure chambers or cylinders 156, 158. The piston assembly 148 can be similar in construction to piston assembly 16 shown in FIG. 1. The chambers 156, 158 have equal areas such that pressure introduced thereto will establish a force on the rod 152 in accordance with the differential of the pressure in the chambers 156 and 158. The chambers 144 and 156 are interconnected for fluid communication through a passage 160. The chambers 146 and 158 are interconnected for fluid communication through a passage 162.

The input disc 116 has a housing portion 164 which is slidably disposed on and drivingly connected with a housing 166 that in turn is slidably disposed on and drivingly connected with a dam piston 168 which in turn is drivingly connected with the input shaft 134. The dam piston 168 is fixed relative to the input shaft 134, and the disc 116 and housing 166 can move axially relative to the input shaft 134 but are rotatably connected therewith. The dam piston 168 and the disc 116 form a fluid chamber 170 which is in fluid communication with a passage 172. The dam piston 168 and the housing 166 form a chamber 174 which is in fluid communication with a passage 176. The fluid chamber 174 will balance the centrifugal effect of the fluid in the chamber 170. Fluid pressure in the chamber 170 will increase the normal force between the discs 116, 118 and disc 116, 120 and the rollers 126 and rollers 128, respectively, while pressure in the chamber 174 will reduce the normal force.

The fluid pressure in the passage 172 is also connected with a conventional downstream regulator valve 178, the output flow and pressure of which is delivered to the passage 176 and therefore chamber 174. This will maintain the pressure at the chamber 174 at a constant value while the pressure in the chamber 170 is being varied. Thus, the normal force on the traction rollers and discs can be varied independently of the dam pressure. The regulator valve is a component of an electro-hydraulic control 180 system.

Besides the valve 178, the control system 180 includes a pump 182 which delivers fluid from a reservoir 184 to the passage 172. A pwm solenoid controlled regulator valve 186 or similar pressure ratio device establishes the maximum pressure in the control system 180 controls the pressure in the passage 172. The passage 172 is also connected with a two position directional valve 188 which is positioned by a pair of solenoids 190 and 192. In the position shown, the valve 188 delivers pressurized fluid from the passage 172 to the passage 160 and therefore the chambers 144 and 156. The valve also connects a passage 194 with the passage 162 for fluid communication with the chambers 146 and 158.

The passages 160 and 162 are connected with opposite ends of a ball shuttle valve 196, the output of which is connected through a passage 198 with a pwm pressure control valve 200. The shuttle valve 196 directs the higher pressure of the passages 160 and 162 to the passage 196 and therefore to the pwm pressure control valve 200. The pressure output of the valve 200 is connected with the passage 194. As is well known with pwm valves, the output pressure is a percentage of the input pressure depending upon the duty cycle imposed on the solenoid of the pwm valve. Thus, the pressure in the passage 194 is a percentage of the pressure in the passage 172.

In the position shown, the pressure in the passage 194 is delivered by the valve 188 through the passage 162 to the chambers 146 and 158. This establishes a pressure differential on the pistons 138 and 150. The traction force within the system is a function of the pressure differential. The valve 188 is positioned by the solenoids 190 and 192 which are energized by an electronic control unit (ECU) which includes a conventional programmable digital computer. When the solenoid 190 is energized, the valve 188 is positioned as shown. When the solenoid 192 is energized, the valve 188 is moved such that the passage 172 is connected with the passage 162 and the passage 194 is connected with the passage 160. Thus, the high and low pressures operating on the pistons 138 and 150 are switched. The high pressure on the pistons 138 and 150 is manipulated to cause the pistons 138 and 150 to urge the rollers 126 and 128 to translate in the toroid chambers to cause a change in the ratio of the traction drive 112. When the new ratio is achieved, the pressure ratio is maintained to provide the desired traction force.

The high pressure is the passage 172 is controlled in accordance with the valve 186 which in turn is controlled by the ECU. The pwm valve 200 which is also controlled by the ECU controls the low pressure in the passage 194. Since the output pressure of the pwm valve 200 is determined by the duty cycle imposed by the ECU, the pressure in the passage 194 is a percentage of the pressure in the passage 172.

The pressure in the chamber 170 is equal to the high pressure in the passage 172, and the regulator valve 178 determines the pressure in the chamber 174. The pressure set by the regulator valve 178 is equal to a constant value as long as the pressure in the passage 172 is greater than the valve setting at valve 178. As previously mentioned, the pressure differential between the chambers 170 and 174 determined the normal force within the traction drive 112.

The differential pressure on the dam piston 168 determines the normal force (NF). The differential pressure on the pistons 138 and 150 determines the traction force (TF). As previously stated, the coefficient of traction (u) is a function of the traction force divided by the normal force. This relationship is represented in equation form as follows:

$$u=TF/NF$$

$$NF=((Hp-Dp)*A1)/(2*cos\ alpha)$$

$$TF=0.5*(Hp-Lp)*A2$$

$$u=(Hp-Lp)*A2/((Hp-Dp)*A1)/cos\ alpha$$

or $$u=(1-\%\ Hp)*(cos\ alpha)*constant$$

where:

% Hp=a percent of Hp set by the duty cycle at the valve 200

Dp=a constant value set by the valve 178.

It should be apparent to those skilled in the art that increasing the low pressure (Lp) issued by the valve 200 will decrease the coefficient of traction (u). It is therefore necessary to select the piston areas (A1, A2) that provide the highest expected coefficient of traction when the low pressure is equal to zero. Increasing the low pressure is undertaken as the coefficient of traction decreases. For example, the coefficient of traction of the fluid will decrease as the temperature of the fluid increases. Thus, at vehicle start, the fluid will normally be cold such that a high coefficient of traction is present. This value will decrease as the fluid temperature increases. The low pressure can be raised at vehicle start and decreased as the fluid temperature increases. A look-up table representing the values of the fluid coefficient of traction relative to temperature can be stored in the ECU for use by the digital computer to control the duty cycle at the valve 200.

Figure 3:
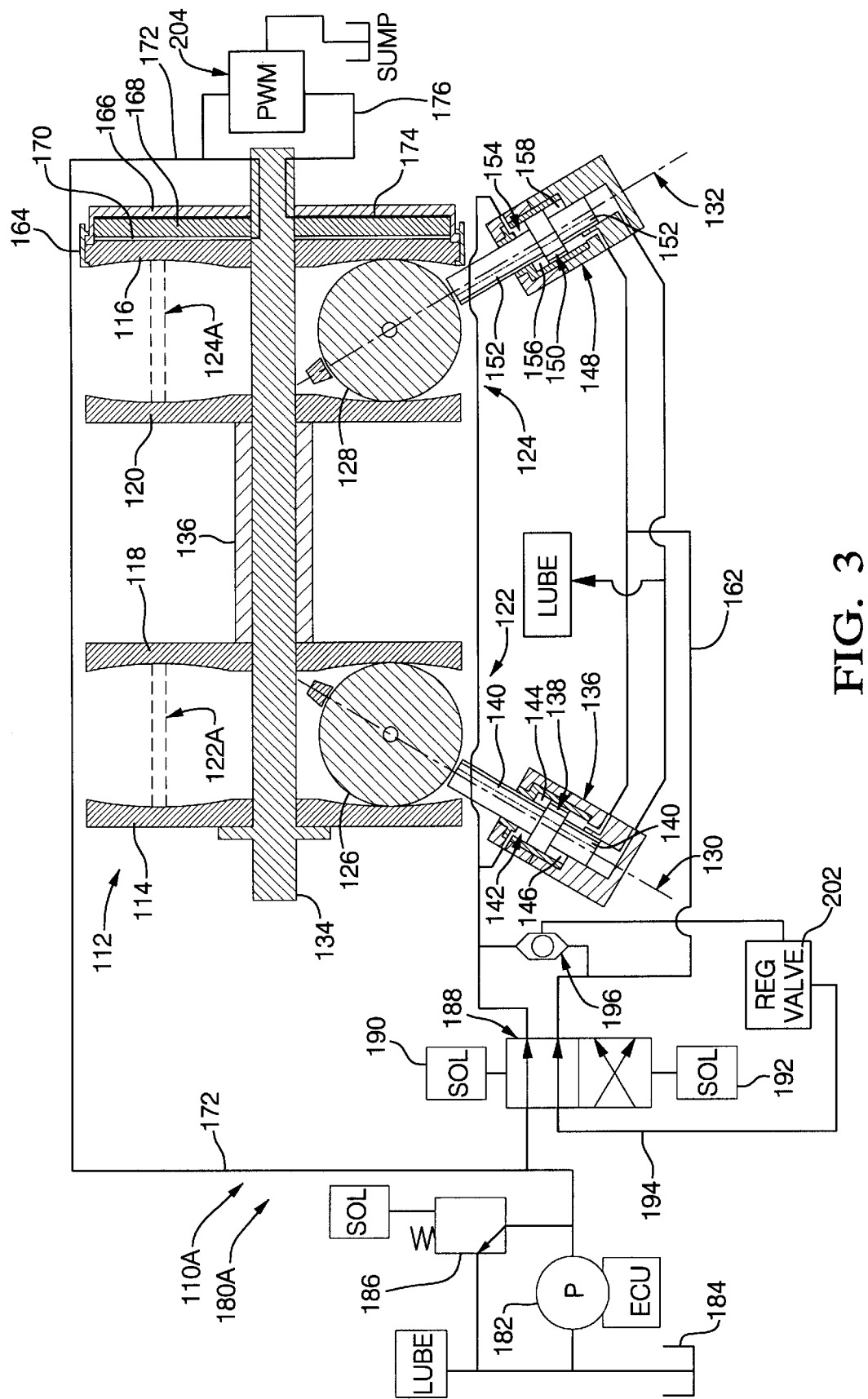
FIG. 3 is a diagrammatic representation of a traction drive incorporating a further embodiment of the present invention.

FIG. 3 is a depiction of traction drive and control 110A which is substantially the same as the traction drive and control 110 shown in FIG. 2. The corresponding components of FIG. 2 and FIG. 3 have been given the same numerical designation. The traction drive 112 is identical in both instances. The electro-hydraulic control 180A in FIG. 3 has two differences which change the control of the normal force (NF) and the traction force (TF). A downstream pressure regulator valve 202 controls the pressure in the passage 194. The pressure in the passage will therefore be a fixed value which is less than the pressure in the passage which supplies fluid to the valve 202 from the shuttle valve.

The other significant change is at the pressure control for the dam pressure (Dp). A pulse width modulated (pwm) valve 204 is installed in the place of the regulator valve 178. The pwm valve receives high pressure from the passage and distributes a pressure which is a function of the duty cycle imposed on the valve 204 from the ECU. Thus, the pressure in the passage 176, which is the dam pressure, is a percentage of the high pressure distributed to the chamber 170.

The differential pressure on the dam piston 168 determines the normal force (NF). The differential pressure on the pistons 138 and 150 determines the traction force (TF). As previously stated, the coefficient of traction (u) is a function of the traction force divided by the normal force. This relationship is represented in equation form as follows:

$$u=TF/NF$$

$$NF=((Hp-Dp)*A1)/(2*cos\ alpha)$$

$$TF=0.5*(Hp-Lp)*A2$$

$$u=(Hp-Lp)*A2/((Hp-Dp)*A1)/cos\ alpha$$

or $$u=cos\ alpha*constant/(1-\%\ Hp)$$

where:

% Hp=a percent of Hp (Dp/Hp) set by the duty cycle at the valve 204

Lp=a constant value set by the valve 202.

It should be apparent to those skilled in the art that increasing the dam pressure (Dp) issued by the valve 204 will increase the coefficient of traction (u). It is therefore necessary to select the piston areas (A1, A2) that provide the lowest expected coefficient of traction when the dam pressure is equal to zero. Increasing the low pressure is undertaken as the coefficient of traction increases. For example, the coefficient of traction of the fluid will decrease as the temperature of the fluid increases. Thus, at vehicle start, the fluid will normally be cold such that a high coefficient of traction is present. This value will decrease as the fluid temperature increases. The dam pressure will be zero at vehicle start and increased as the fluid temperature increases. A look-up table representing the values of the fluid coefficient of traction relative to temperature can be stored in the ECU for use by the digital computer to control the duty cycle at the valve 204.

What is claimed is:

1. A traction transmission and control comprising:

a traction drive having spaced discs, a traction roller disposed between and in frictional engagement with said discs, first piston means for enforcing a normal force between said discs and said traction roller, and second piston means for enforcing a traction force between said discs and said roller;

a traction fluid disposed between said discs and said traction roller and having a variable coefficient of traction;

a source of fluid pressure;

first control valve means for supplying fluid at a first pressure level from said source to said first and second piston means to establish a normal force at said first piston means and a traction Force at said second piston means;

second control valve means receiving fluid from said first control valve means for delivering fluid at a variable pressure level to said second piston means to cause a variation of said traction force at said second piston means in accordance with the coefficient of traction of said traction fluid.

2. The traction transmission and control defined in claim 1 further wherein said second piston means having a first area and a second area;

directing valve means for selectively delivering said fluid at said first pressure level to one of said first area or second area and said fluid at said variable pressure level to the other of said first or second area.

3. The traction transmission and control defined in claim 1 further comprising:

third valve means, receiving fluid at said first pressure level, for delivering fluid at a third pressure level to said first piston means to apply a force thereto in opposition to said first pressure level.

4. The traction transmission and control defined in claim 1 further comprising:

said first piston means having a first area and a second area, said first area being pressurized at said first pressure level; and a third valve means, receiving fluid at said first pressure level, for delivering fluid to said second area at a second pressure level.

5. A traction transmission and control comprising:

a traction drive having spaced discs, a traction roller disposed between and in frictional engagement with said discs, first piston means for enforcing a normal force between said discs and said traction roller, and second piston means for enforcing a traction force between said discs and said roller;

a traction fluid disposed between said discs and said traction roller and having a variable coefficient of traction;

a source of fluid pressure;

first control valve means for supplying fluid at a first pressure level from said source to said first and second piston means to establish a normal force at said first piston means and a traction force at said second piston means;

second control valve means, receiving fluid from said first pressure level, for delivering fluid at a second pressure level to said second piston means;

third control valve means, receiving fluid at said first pressure level, for delivering fluid at a third pressure level to said first piston means; and one of said second control valve means and said third control valve means producing a variable pressure level at said respective second pressure level and said third pressure level.

6. The traction transmission and control defined in claim 5 further comprising:

said first piston means having a first area in fluid communication with said first pressure level and being effective to increase the normal force, and a second area in fluid communication with said third pressure level and being effective to decrease the normal force; and said second piston means having a first area in selective fluid communication with fluid at said first pressure level and said second pressure level and being effective to increase the traction force as the first pressure to level increases and to reduce said traction force when said second pressure level increased, and a second area in selective fluid communication with said second pressure level and said first pressure level and being effective to decrease the traction force when said second pressure level increases and to increase said pressure level when said first pressure level increases.

7. The traction transmission and control defined in claim 6 further comprising:

directional valve means for selectively directing fluid from said first valve means and said second valve means for providing selective fluid communication with said first area and second area of said second piston means; and shuttle valve means downstream of said directional valve means for directing fluid at said first pressure level to an inlet of said second valve means.

* * * * *